United States Patent
Muro (10) Patent No.: US 7,299,302 B2
(45) Date of Patent: Nov. 20, 2007

(54) DIRECT MEMORY ACCESS CONTROL APPARATUS AND METHOD

(75) Inventor: Tomoharu Muro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 406 days.

(21) Appl. No.: 10/953,335

(22) Filed: Sep. 30, 2004

(65) Prior Publication Data

US 2005/0216605 A1    Sep. 29, 2005

(30) Foreign Application Priority Data

Mar. 23, 2004    (JP) ............... 2004-084424

(51) Int. Cl.
*G06F 13/14*    (2006.01)
*G06F 13/28*    (2006.01)

(52) U.S. Cl. ............... 710/5; 710/22; 710/33; 710/52

(58) Field of Classification Search ............ None
See application file for complete search history.

(56) References Cited

U.S. PATENT DOCUMENTS 6,542,941 B1 * 4/2003 Simpson, III ............... 710/30

FOREIGN PATENT DOCUMENTS

JP    5-216808    8/1993

* cited by examiner

*Primary Examiner*—Ilwoo Park
(74) *Attorney, Agent, or Firm*—Staas & Halsey LLP

(57) ABSTRACT

In a DMA control apparatus for controlling data transfer from a memory to a transfer destination apparatus in accordance with a command assigned from a processing apparatus, a data transfer command assigned from the processing apparatus is stored in a command storage device and when the data transfer command includes transfer data to be transferred to the transfer destination apparatus, the transfer data is read out from the command storage device, thereby transferring the read-out data to the transfer destination apparatus.

8 Claims, 12 Drawing Sheets

PRIOR ART

F I G. 1A

PRIOR ART

F I G. 1 B

PRIOR ART

DIRECT MEMORY ACCESS CONTROL APPARATUS AND METHOD

BACKGROUND OF THE INVENTION

1. Field of the Invention

The present invention relates to an apparatus and a method for controlling direct memory access (DMA) in a data processing apparatus that requires high-speed data transfer.

2. Description of the Related Art

In a computer system, it is desirable to perform effective high-capacity data transfer between memories or a memory and an input/output device (I/O device). DMA is a well known method for solving this problem (refer to, for example, Japanese laid-open Patent application No 05-216, 808).

An I/O device transfers data to a memory and receives data transferred from the memory. This device includes a memory apparatus and an interface apparatus. DMA has a mechanism in which exclusive hardware called a DMA control circuit controls data transfer on the basis of a command from the central processing unit (CPU), instead of the CPU, itself, controlling the data transfer in a computer system.

The command that is issued to a DMA control circuit from a CPU is called a descriptor. A method such that the DMA control circuit autonomously reads out the descriptor from a memory and refers to the descriptor after the CPU prepares the descriptor on the memory is widely used.

Figure 1A:
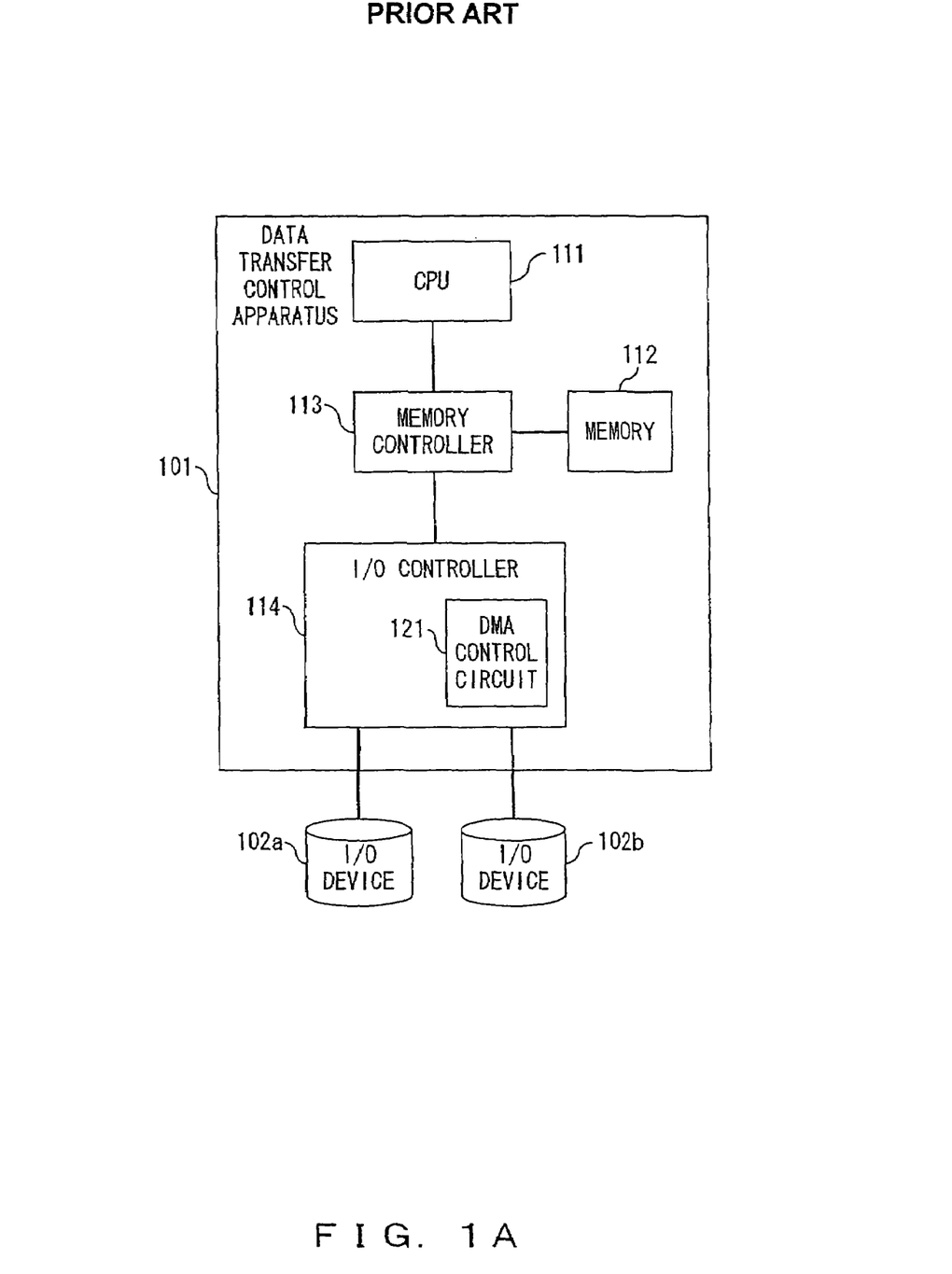
FIG. 1A shows a block diagram of a conventional data processing apparatus.

FIG. 1A shows a configuration example of a conventional data processing apparatus provided with a DMA control circuit. The data processing apparatus of FIG. 1A comprises a data transfer control apparatus 101 and I/O devices 102a and 102b. The data transfer control apparatus 101 comprises a CPU 111, a memory 112, a memory controller 113 and an I/O controller 114.

A CPU 111, a memory 112 and an I/O controller 114 are connected to the memory controller 113. The I/O devices 102a and 102b are connected to the I/O controller 114. The number of I/O devices connected to the I/O controller 114 is not restricted to two and generally, one or a plurality of I/O devices is connected.

The memory controller 113 controls data transfer between the CPU 111 and the memory 112 and also between the I/O controller 114 and the memory 112. A DMA control circuit 121 included in the I/O controller 114 performs data transfer between the memory 112 and the I/O device 102 through the memory controller 113. Also, the CPU 111 and the I/O controller 114 receive and transmit control information through the memory controller 113.

Figure 1B:
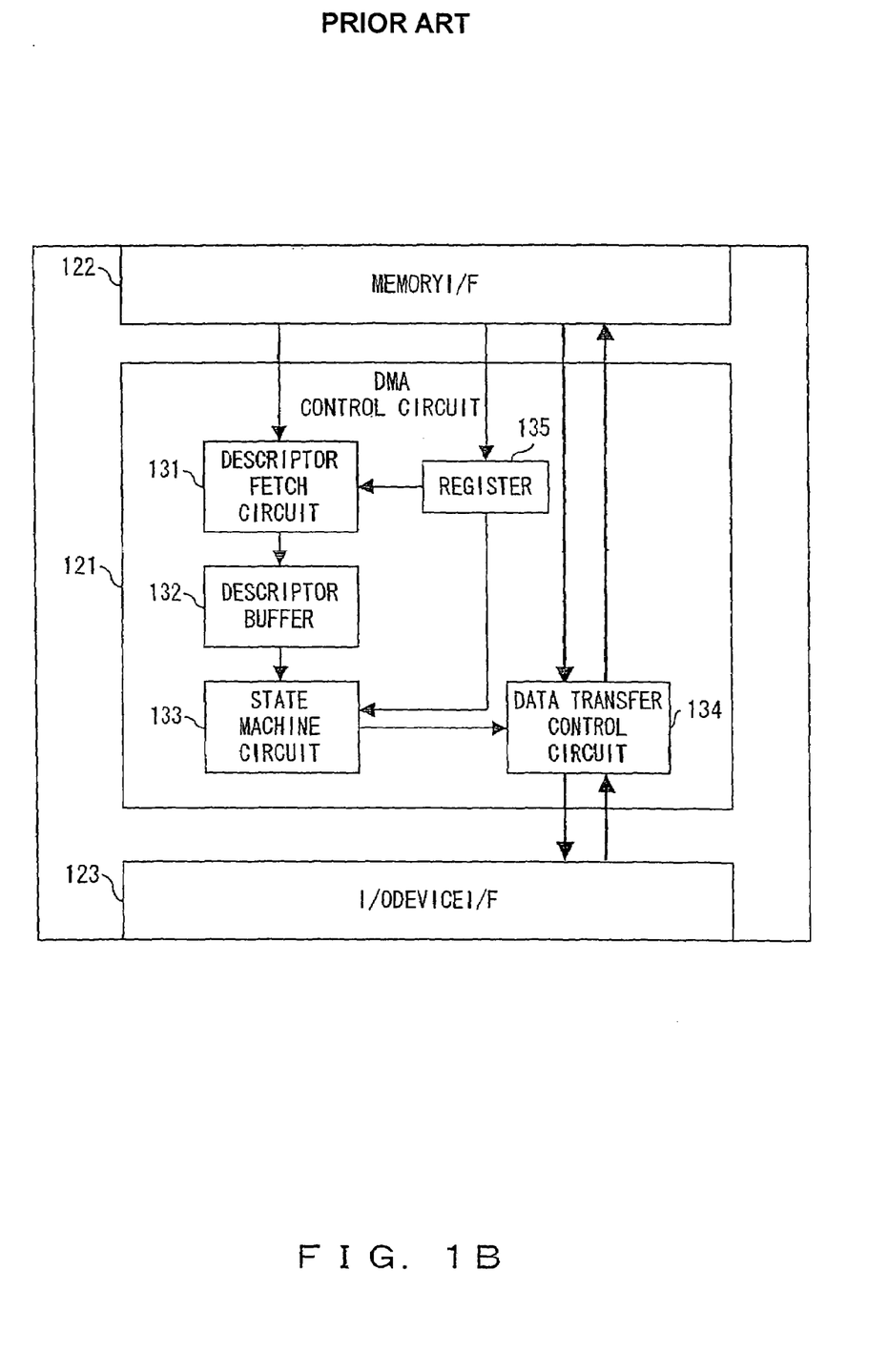
FIG. 1B shows a block diagram of a conventional I/O controller.

FIG. 1B shows a block diagram of the I/O controller 114 of FIG. 1A. The I/O controller 114 of FIG. 1B comprises the DMA control circuit 121, a memory interface (I/F) 122 and an I/O device interface 123.

The DMA control circuit 121 comprises a descriptor fetch circuit 131, a descriptor buffer 132, a state machine circuit 133, a data transfer control circuit 134 and a register 135.

The CPU 111 activates the descriptor fetch circuit 131 and the state machine circuit 133 by writing the activation instructions in the register 135 through the memory interface 122.

The descriptor fetch circuit 131 reads out a descriptor from the memory 112 through the memory interface 122. The descriptor buffer 132 receives the descriptor from the descriptor fetch circuit 131 and stores it. The state machine circuit 133 analyzes the descriptor and instructs the data transfer control circuit 134 about data transfer. Upon receipt of the instruction from the state machine circuit 133, the data transfer control circuit 134 performs data transfer through the memory interface 122 and the I/O device interface 123.

Figure 1C:
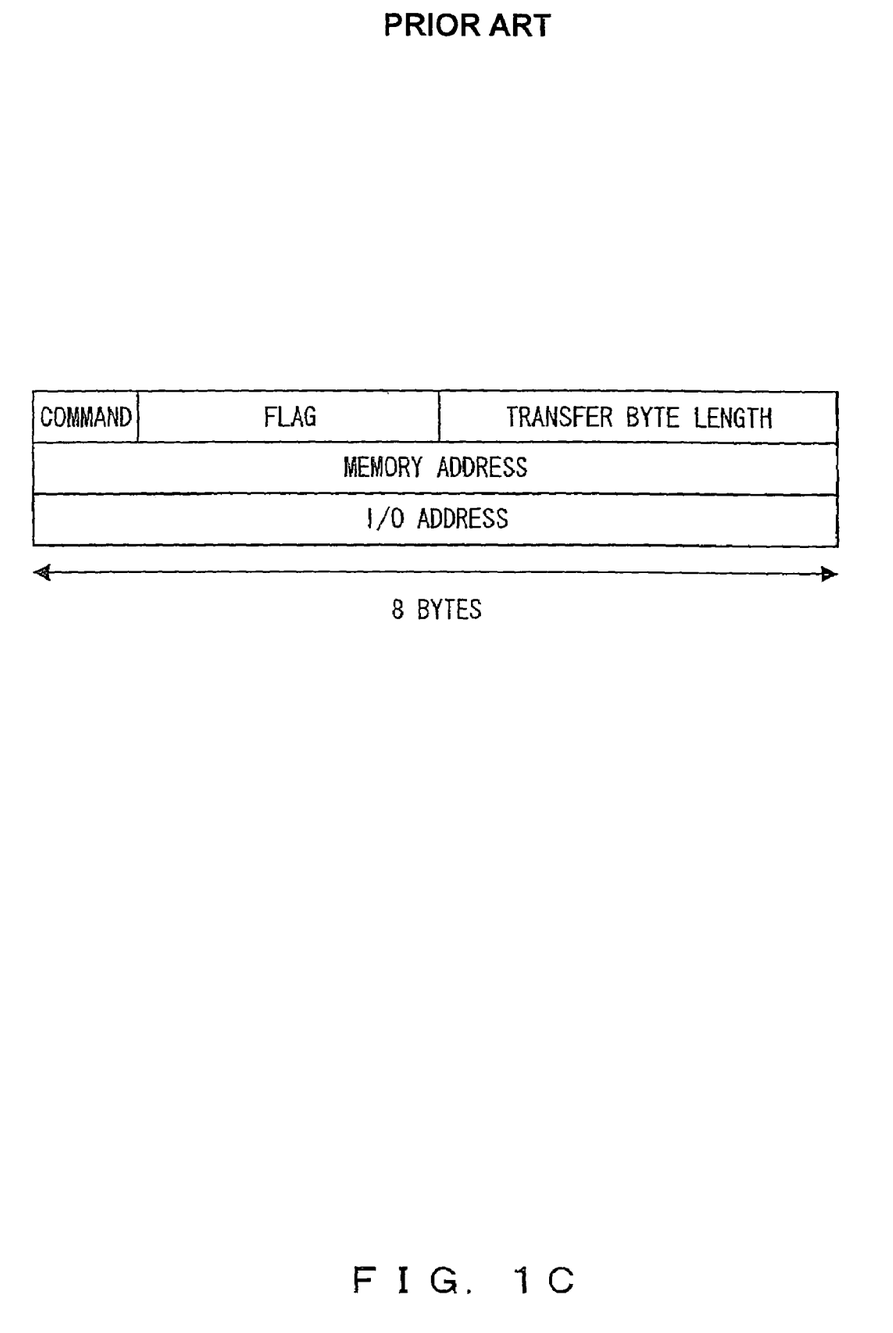
FIG. 1C shows a conventional descriptor.

FIG. 1C shows one example of a descriptor. The descriptor of FIG. 1C has a length of 8 bytes*3 words (24 bytes) and it comprises a command, a flag, a transfer byte length, a memory address and an I/O address.

A command is a bit that instructs the direction of data transfer. For example, if a bit is logic '0', it indicates read transfer, that is, data transfer from the I/O device 102 to the memory 112. If a bit is logic '1', it indicates write transfer, that is, data transfer from the memory 112 to the I/O device 102.

A flag is a bit that controls various operations of DMA. For example, such a bit instructs the DMA control circuit 121 to generate an interrupt after the termination of data transfer. A transfer byte length indicates a field for instructing the DMA control circuit 121 about the length (number of bytes) of data to be transferred between the memory 112 and the I/O device 102.

At the time of read transfer, a memory address shows an address on the memory 112 that stores data read out from the I/O device 102. At the time of a write operation, a memory address shows the address on the memory 112 that stores data to be transferred to the I/O device 102. An I/O address shows both a number of the I/O device 102 for reading out data and an address in this device at the time of a read operation while this address indicates both a number of the I/O device 102 for writing data and an address in this device at the time of a write operation.

Figure 1D:
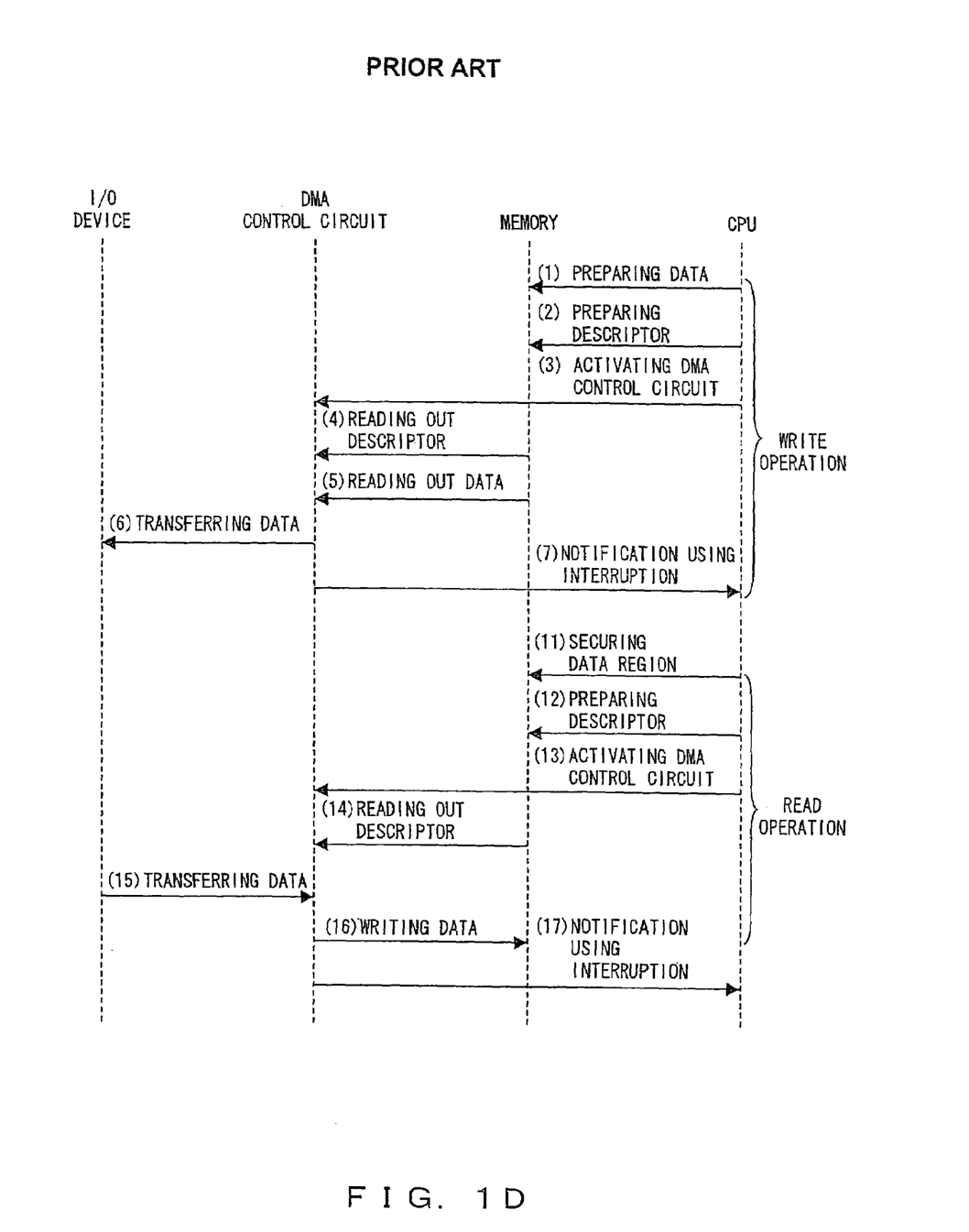
FIG. 1D shows a conventional operation sequence.

Then, the following is the explanation for each of DMA write and read operations in reference to the operation sequence of FIG. 1D.

<Write Operation>

(1) The CPU 111 prepares transfer data in the address designated by a descriptor on the memory 112.

(2) The CPU 111 prepares the descriptor for write transfer in the address predetermined on the memory 112 using the format of FIG. 1C.

(3) The CPU 111 activates the DMA control circuit 121 by writing an activation instruction in the register 135 inside of the DMA control circuit 121.

(4) When the DMA control circuit 121 is activated by the CPU 111, it reads out the descriptor from the predetermined address on the memory 112.

(5) The DMA control circuit 121 analyzes the read-out descriptor and reads out data of the designated transfer byte length from the memory address designated in the descriptor if the command is a write instruction.

(6) Subsequently, the DMA control circuit 121 transfers the data read out from the memory 112 to the I/O device 102 on the basis of the I/O address designated in the descriptor.

(7) When the data transfer terminates, the DMA control circuit 121 transmits an interrupt signal to the CPU 111 in accordance with the instructions of a flag in the descriptor and notifies a data transfer termination.

<Read Operation>

(11) The CPU 111 secures a region for transfer data in the address designated by a descriptor on the memory 112.

(12) The CPU 111 prepares the descriptor for read transfer using the format of FIG. 1C in the predetermined address on the memory 112.

(13) The CPU 111 activates the DMA control circuit 121 by writing an activation instruction in the register 135 inside of the DMA control circuit 121.
(14) When the DMA control circuit 121 is activated by the CPU 111, it reads out the descriptor from the predetermined address.
(15) The DMA control circuit 121 analyzes the read-out descriptor and in case of a read instruction, the circuit reads out the data of the designated transfer byte length from the I/O device 102 indicated by the I/O address designated in the descriptor.
(16) Subsequently, the DMA control circuit 121 writes the data read out from the I/O device 102 in the memory address designated by the descriptor.
(17) When the data transfer terminates, the DMA control circuit 121 transmits an interruption signal to the CPU 111 in accordance with the instructions of a flag in the descriptor and notifies a data transfer termination.

As is apparent from the above-mentioned operation sequence, when the CPU 111 prepares a descriptor and activates the DMA control circuit 121, it can perform another processing while data transfer is being performed until a notification is given by the interruption signal. In this way, since the CPU 111 is released from a comparatively simple process such as data transfer and can devote a time to a more complicated process, the performance of the system improves.

There is the following problem in the above-mentioned conventional DMA control method.

The DMA control circuit is effective for reducing the load of a CPU by performing data transfer in place of a CPU and also for enhancing the processing performance of a system thereof. In a conventional DMA control method, however, data transfer is performed after the DMA control circuit reads out the descriptor on a memory prepared by the CPU. Therefore, there is a case such that sufficient performance cannot be obtained in the case where the access•latency (time required for reading out a descriptor) from a DMA control circuit to a memory is large. This problem prominently occurs especially in the case where short data is transferred.

In the case of transferring short data, the transfer time between a DMA control circuit and an I/O device is shorter in comparison with a time required for the transfer of long data. However, a time required for the other control operation is almost identical to a time required for the transfer of long data. Therefore, the ratio of a time required for a control operation other than the data transfer to the whole operation time becomes high in comparison with a time required for the transfer of long data, thereby decreasing the efficiency of the data transfer.

SUMMARY OF THE INVENTION

The subject of the present invention is to offer an apparatus and a method of increasing the efficiency of data transfer using DMA in a data processing apparatus.

In the first aspect of the present invention, a DMA control apparatus comprises a command storage device and a transfer control device, and controls data transfer from a memory to a transfer destination apparatus in accordance with the command assigned from a processing apparatus.

The command storage device stores a data transfer command assigned from the processing apparatus. The transfer control device checks whether or not the data transfer command stored in the command storage device includes transfer data to be transferred to the transfer destination apparatus. When the data transfer command does not include the transfer data, the device reads out the transfer data from a memory and transfers the read-out data to the transfer destination apparatus. When the data transfer command includes the transfer data, the device reads out the transfer data from the command storage device and transfers the read-out data to the transfer destination apparatus.

In the second aspect of the present invention, when data transfer from a memory to a transfer destination apparatus occurs, a processing apparatus assigns a command to a direct memory access control apparatus for controlling the data transfer.

The processing apparatus checks whether or not the data length of transfer data to be transferred to the transfer destination apparatus is longer than a predetermined value. If the data length is longer than the predetermined value, the apparatus stores the transfer data in the memory and sets flag information indicating that a data transfer command does not include the transfer data and a memory address of the transfer data, in the data transfer command. If the data length is equal to or less than the predetermined value, the apparatus sets the transfer data and flag information indicating that the data transfer command includes the transfer data, in the data transfer command. Then, the apparatus activates the DMA control apparatus and directs this apparatus to perform data transfer designated by the data transfer command.

DESCRIPTION OF THE PREFERRED EMBODIMENTS

The following is detailed explanation of the preferred embodiment of the present invention referring to drawings.

Figure 2A:
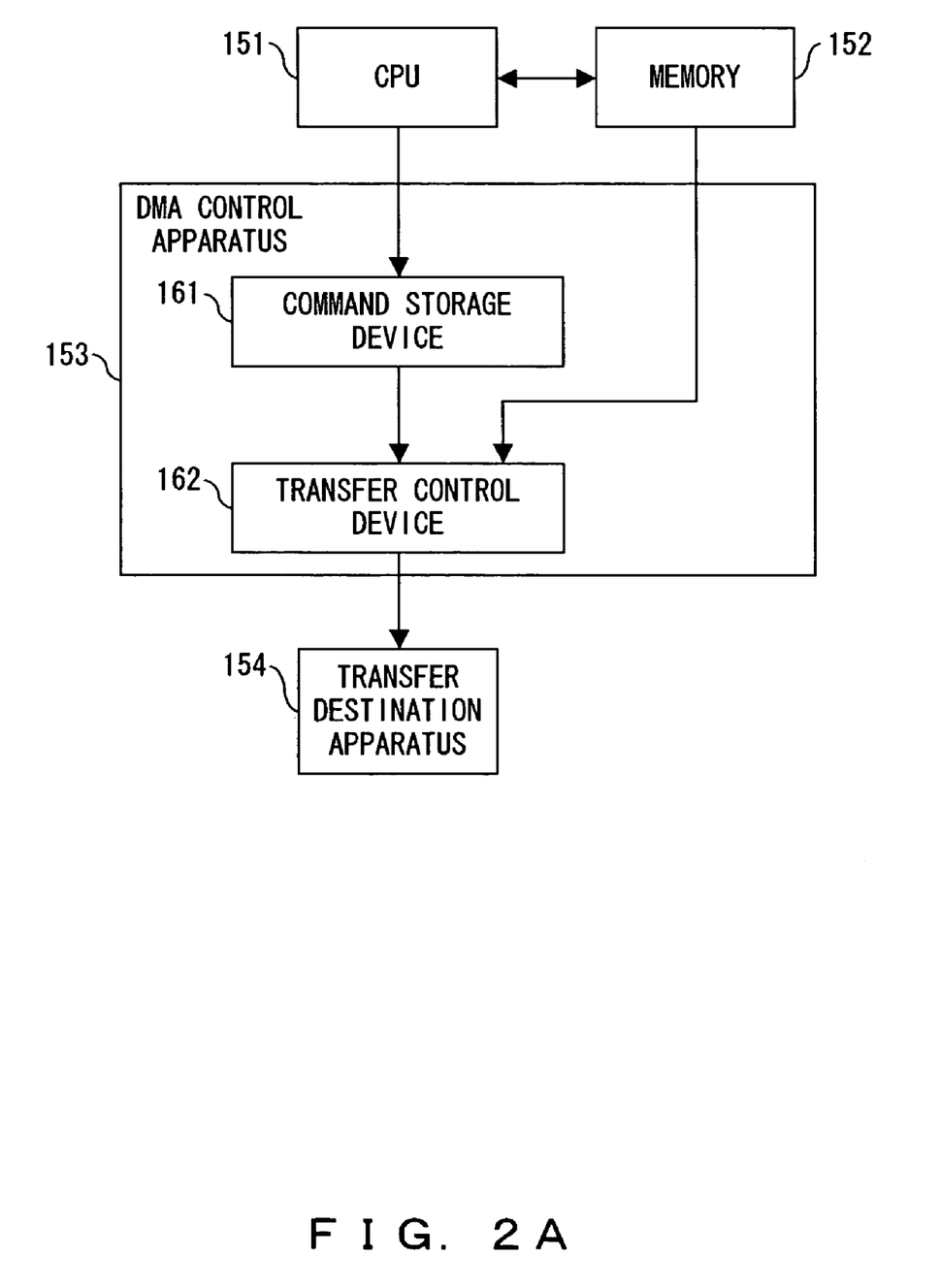
FIG. 2A shows the principle diagram of a DMA control apparatus of the present invention.

FIG. 2A is a block diagram of a DMA control apparatus of the present invention. A DMA control apparatus 153 of FIG. 2A comprises a command storage device 161 and a transfer control device 162, and it controls data transfer from a memory 152 to a transfer destination apparatus 154 in accordance with the command assigned from a CPU 151.

The command storage device 161 stores the data transfer command assigned from the CPU 151. The transfer control device 162 checks whether or not the data transfer command stored in the command storage device 161 includes transfer data to be transferred to the transfer destination apparatus 154. When the data transfer command does not include the transfer data, the device 162 reads out the transfer data from the memory 152 and transfers the data to the transfer destination apparatus 154. When the data transfer command includes the transfer data, the device 162 reads out the transfer data from the command storage device 161 and transfers the read-out data to the transfer destination apparatus 154.

When the data transfer command is issued to the DMA control apparatus 153 from the CPU 151 DMA, the control apparatus 153 obtains the data transfer command and stores it in the command storage device 161. The transfer control device 162 analyzes the stored data transfer command. When the transfer data is not included in the data transfer command, the transfer control device 162 reads out the transfer data from the memory 152 and transfers the read-out data to the transfer destination apparatus 154. When the transfer data is included in the data transfer command, the device 162 directly transfers the transfer data to the transfer destination apparatus 154.

According to such a DMA control apparatus, in the case where transfer data is included in a data transfer command, write transfer to the transfer destination apparatus 154 can be performed without performing a memory read operation if a data transfer command is obtained once. Therefore, the time required for the write transfer is shortened.

The transfer destination apparatus 154 corresponds to, for example, the above-mentioned I/O device 102 of FIG. 1A. The DMA control apparatus 153 corresponds to, for example, a DMA control circuit 201 of FIG. 2B that is described later. In addition, the command storage device 161 corresponds to, for example, a descriptor buffer 212 of FIG. 2B. The transfer control device 162 corresponds to, for example, a state machine circuit 213 and a data transfer control circuit 214 of FIG. 2B. The transfer command corresponds to, for example, a descriptor of FIG. 3 that is described later.

Furthermore, when data transfer from the memory 152 to the transfer destination apparatus 154 occurs, the CPU 151 assigns a command to the DMA control apparatus 153 that controls the data transfer.

The CPU 151 checks whether or not the data length of transfer data to be transferred to the transfer destination apparatus 154 is longer than a predetermined value. If the data length is longer than the predetermined value, the CPU 151 stores the transfer data in the memory 152 and sets flag information showing that a data transfer command does not include the transfer data and a memory address of the transfer data, in the data transfer command. If the data length is equal to or below the predetermined value, the CPU 151 sets the transfer data and flag information showing that the data transfer command includes the transfer data, in the data transfer command. Then, the CPU 151 activates the DMA control apparatus 153 and directs this apparatus to perform data transfer designated by the data transfer command.

Since the CPU 151 performs such processings, the transfer data of a data length equal to or below the predetermined value is set in the data transfer command and the set data is assigned to the DMA control apparatus 153. Therefore, the time required for the write transfer of comparatively short data is shortened. In addition, since transfer data longer than the predetermined value need not be set in the data transfer command, the increment of the data transfer command in size can be set approximately to the above-mentioned predetermined value.

Figure 3:
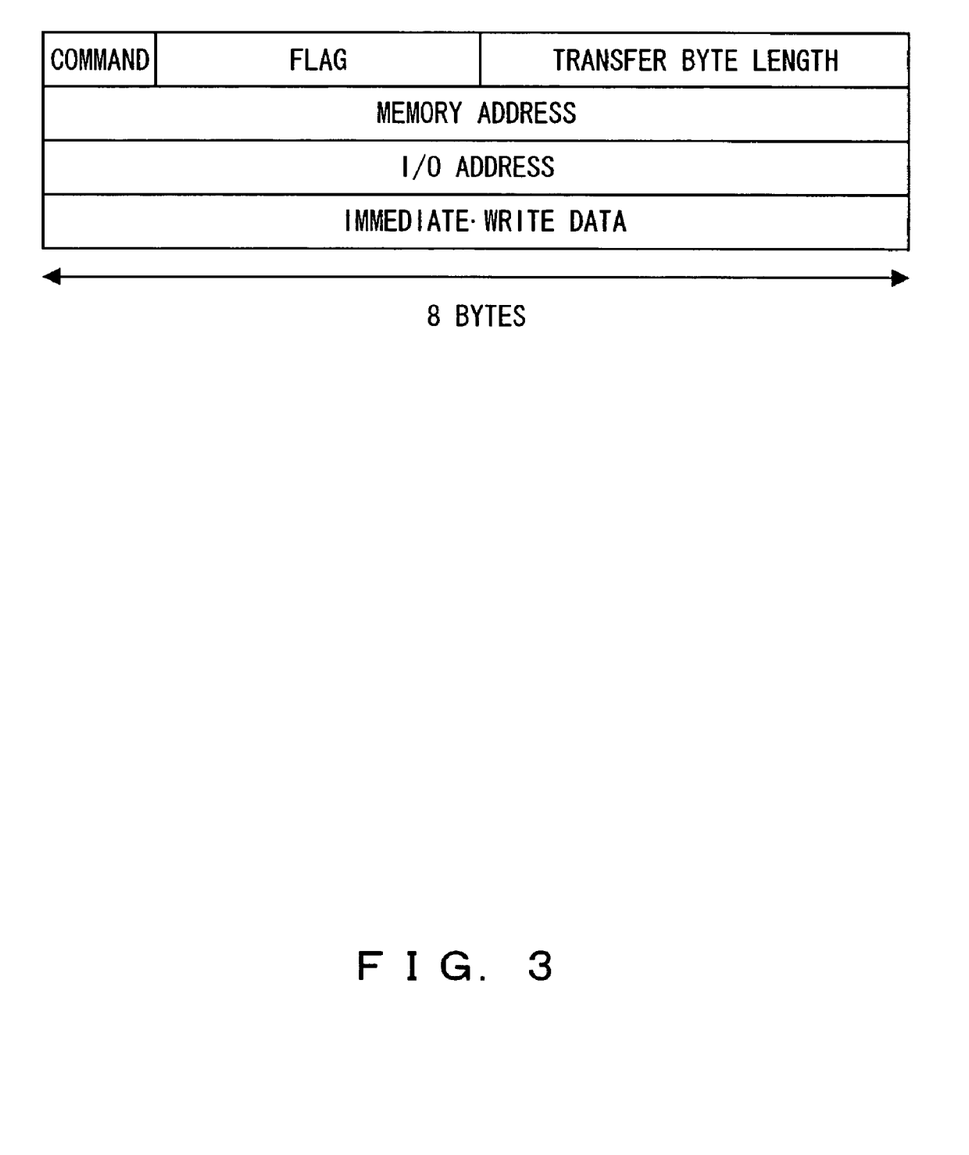
FIG. 3 shows a descriptor of the present invention.

The flag information that is set by the CPU 151 corresponds to, for example, a write•immediate•bit included in a flag of the descriptor of FIG. 3.

According to the present invention, a time required for the data transfer from a memory to a transfer destination apparatus using DMA can be shortened in a data processing apparatus.

The whole configuration of a data processing apparatus of the present embodiment is identical to the data processing apparatus of FIG. 1A. In the command to the DMA control circuit, the efficiency of write transfer is promoted by enabling the DMA control circuit to select either the designation of an address in which data is stored or the designation of data itself. Therefore, the data processing apparatus of the present preferred embodiment comprises the following characteristics.

A bit (write•immediate•bit) that shows write•immediate is provided in a flag field of the descriptor.

The DMA control circuit selects whether to read out data from the designated memory address so as to perform write transfer or to perform write transfer of the data in the descriptor, in accordance with the write•immediate•bit.

The DMA control circuit reads out data from a memory address designated in the descriptor and transfers the read-out data to an I/O device as is conventionally done if the write•immediate•bit of a flag field of the descriptor is logic '0'. If the write•immediate•bit is logic '1', the circuit transfers the data that is set in a write data field inside of the descriptor to an I/O device.

For example, in the case where the data of a short length within a predetermined value is write-transferred, a CPU sets a write•immediate•bit to '1' and sets the write data in the descriptor. In this way, the DMA control circuit autonomously transfers the write data that is set in the descriptor. As the predetermined value of a data length, the values of, for example, 8 bytes, 16 bytes, 64 bytes, etc. are used.

On the other hand, in the case where data longer than a predetermined value is write-transferred, a CPU sets a write•immediate•bit to '0' and stores the write data in a memory. In this way, the DMA control circuit autonomously transfers the write data that is stored in the memory.

In the case where short data of, for example, 8 bytes is write-transferred, a conventional DMA control circuit first reads out a descriptor from a memory and analyzes the descriptor. Then, the circuit must read out the data from a designated address so that a memory-read operation is performed continuously twice. Furthermore, the address in which the data is stored can be determined only by reading the descriptor and the two memory-read operations cannot be simultaneously performed. Consequently, it takes a rather long time to transfer data of only 8 bytes.

In the case of short data, the data is prepared in a descriptor region beforehand in a DMA control circuit of the present preferred embodiment. Therefore, data transfer can be started by one memory-read operation. Therefore, an effect of shortening a time required for write transfer can be obtained.

Figure 2B:
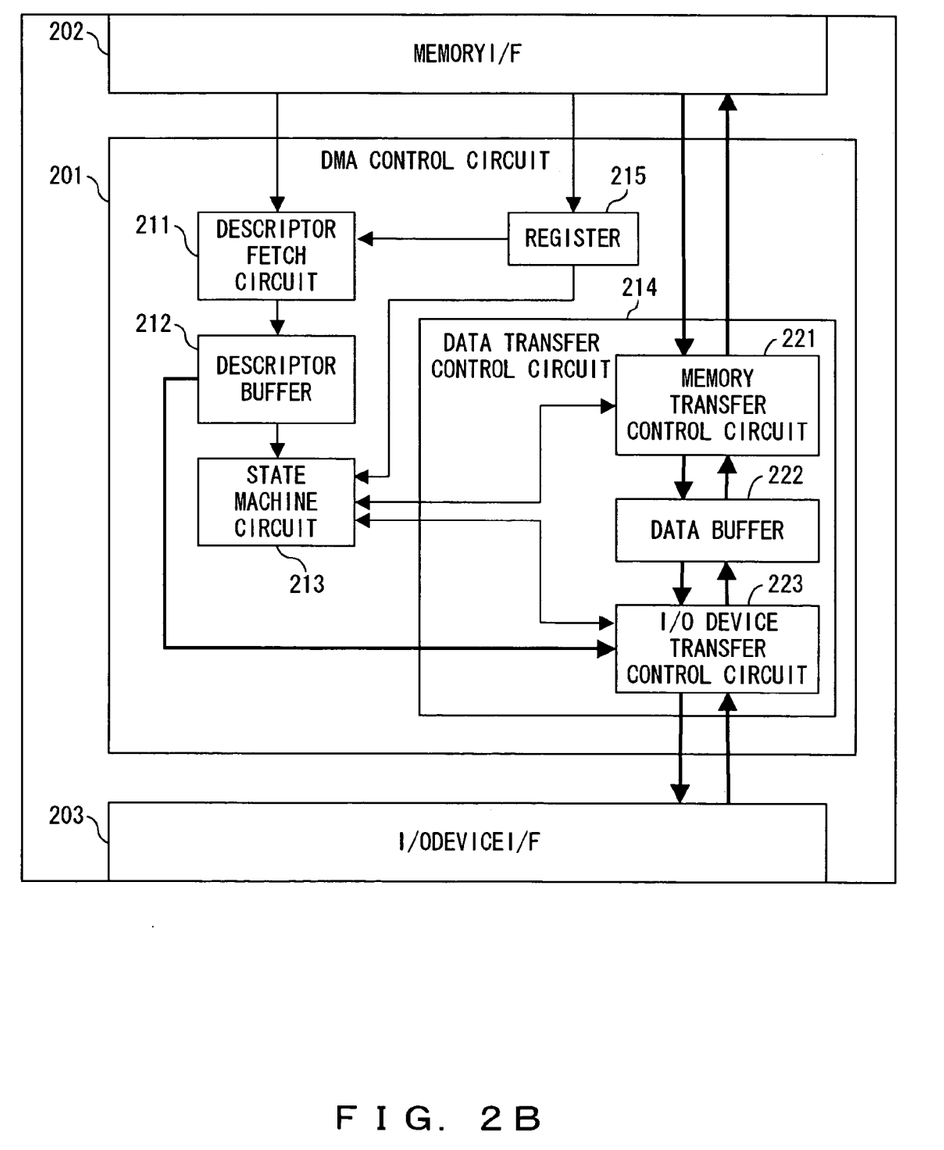
FIG. 2B shows a block diagram of an I/O controller of the present invention.

FIG. 2B is a block diagram of an I/O controller of the present preferred embodiment. The I/O controller of FIG. 2B comprises the DMA control circuit 201, a memory interface 202 and an I/O device interface 203. The DMA control circuit 201 comprises a descriptor fetch circuit 211, a descriptor buffer 222, the state machine circuit 213, a data transfer control circuit 214 and a register 215.

Similarly to the case of FIG. 1B, the CPU activates the descriptor fetch circuit 211 and the state machine circuit 213 by writing activation instructions in the register 215 through the memory interface 202.

The descriptor circuit 211 reads out a descriptor from a memory through the memory interface 202 and stores it in the descriptor buffer 212. The state machine circuit 213 analyzes the descriptor which is stored in the descriptor buffer 212 and instructs the data transfer control circuit 214 to perform data transfer. Upon receipt of the instruction from the state machine circuit 213, the data transfer control circuit 214 performs data transfer through the memory interface 202 and the I/O device interface.

The data transfer control circuit 214 comprises a memory transfer control circuit 221, a data buffer 222 and an I/O device transfer control circuit 223. The memory transfer control circuit 221 is activated by the state machine circuit 213 and performs data transfer between the memory and the data buffer 222 through the memory interface 202. The I/O device transfer control circuit 223 is activated by the state machine circuit 213 and performs data transfer between the data buffer 222 and an I/O device through the I/O device interface 203.

At this time, if a write•immediate•bit is '1', the I/O device transfer control circuit 223 reads out data that is set in a descriptor stored in the descriptor buffer 212 and transfers the read-out data to the I/O device.

FIG. 3 shows one example of a descriptor issued by a CPU. The descriptor of FIG. 3 has a length of 8 bytes*4 word (32 bytes) and comprises a command, a flag, a transfer byte length, a memory address, an I/O address and immediate•write data. In this example, a write•immediate•bit is included in the flag and a data length of the immediate•write data is 8 bytes.

In the case where write data is longer than 8 bytes, a CPU sets a write•immediate•bit to '0' and set a memory address in which the write data is stored in the memory address field inside of a descriptor. Furthermore, in the case where write data is equal to or less than 8 bytes, the CPU sets a write•immediate•bit to '1' and it sets write data in a immediate•write data field of the descriptor.

Figure 4:
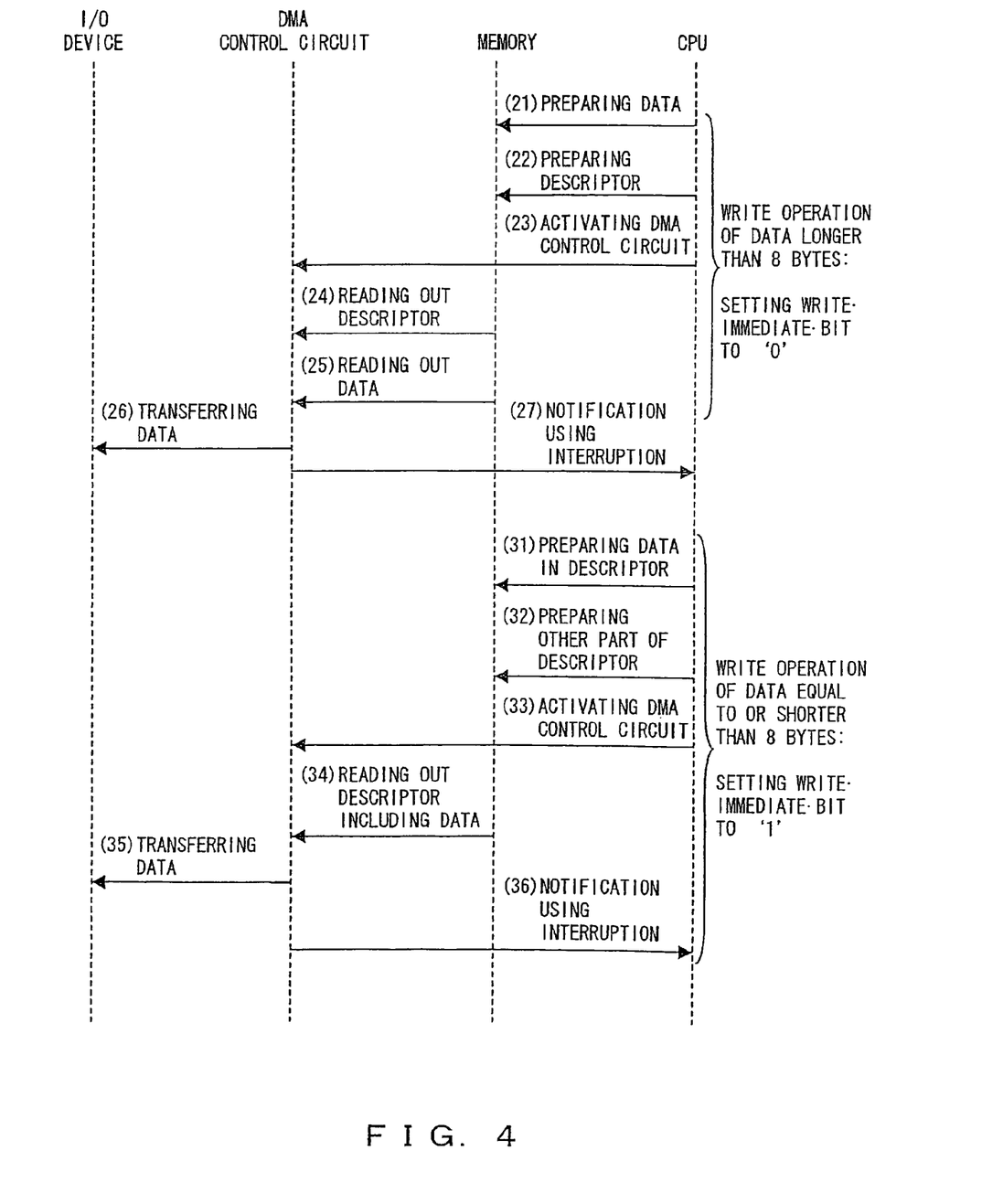
FIG. 4 shows an operation sequence of the present invention.

The following is the explanation of DMA write operations in the respective cases where write•immediated•bits are '0' and '1' while in reference to the operation sequence of FIG. 4.

<In the Case where a Write Data Byte is Longer than 8 Bytes: in the Case where a Write•Immediate•Bit is '0'>
(21) A CPU prepares transfer data in the address designated by the descriptor on a memory.
(22) The CPU prepares the descriptor for write transfer in the address predetermined on an address using the format of FIG. 3. At this time, a write•immediate•bit in the descriptor is set to '0'.
(23) The CPU activates the DMA control circuit 201 by writing activation instructions in the register 215 inside of the DMA control circuit 201.
(24) When the DMA control circuit 201 is activated by the CPU, it reads out the descriptor from an address predetermined on the memory.
(25) The DMA control circuit 201 analyzes the read-out descriptor and reads out data of the designated transfer byte length from the memory address designated in the descriptor if the descriptor is a write instruction and a write•immediated•bit is '0', thereby storing the read-out data in the data buffer 222.
(26) Subsequently, the DMA control circuit 201 transfers the data stored in the data buffer 222 to an I/O device on the basis of the I/O address designated in the descriptor.
(27) When the data transfer terminates, the DMA control circuit 201 transmits an interruption signal to the CPU in accordance with the instructions of a flag in the descriptor and notifies a data transfer termination.

<In the Case where Write Data is Equal to or Less than 8 Bytes: in the Case where a Write•Immediated•Bit is Logic '1'.
(31) The CPU prepares a descriptor for write transfer using the format of FIG. 3 in the predetermined address on a memory and prepares transfer data in the immediate•write data field.
(32) The CPU prepares information about a field other than the descriptor. At this time, the CPU sets a write•immediate•bit in the descriptor to '1'.
(33) The CPU activates the DMA control circuit 201 by writing activation instructions in the register 215 inside of the DMA control circuit 201.
(34) When the DMA control circuit 201 is activated by the CPU, it reads out the descriptor from the designated address on a memory and stores the read-out descriptor in the descriptor buffer 212.
(35) The DMA control circuit 201 analyzes the descriptor in the descriptor buffer 212. If the command is a write instruction and a write•immediate•bit is '1', the circuit reads out data of the designated transfer byte length from a immediate•write data field in the descriptor and transfers the read-out data to an I/O device on the basis of the I/O address designated in the descriptor.
(36) When the data transfer terminates, the DMA control circuit 201 transmits an interruption signal to the CPU in accordance with the instructions of a flag in the descriptor and notifies a data transfer termination.

Figure 5:
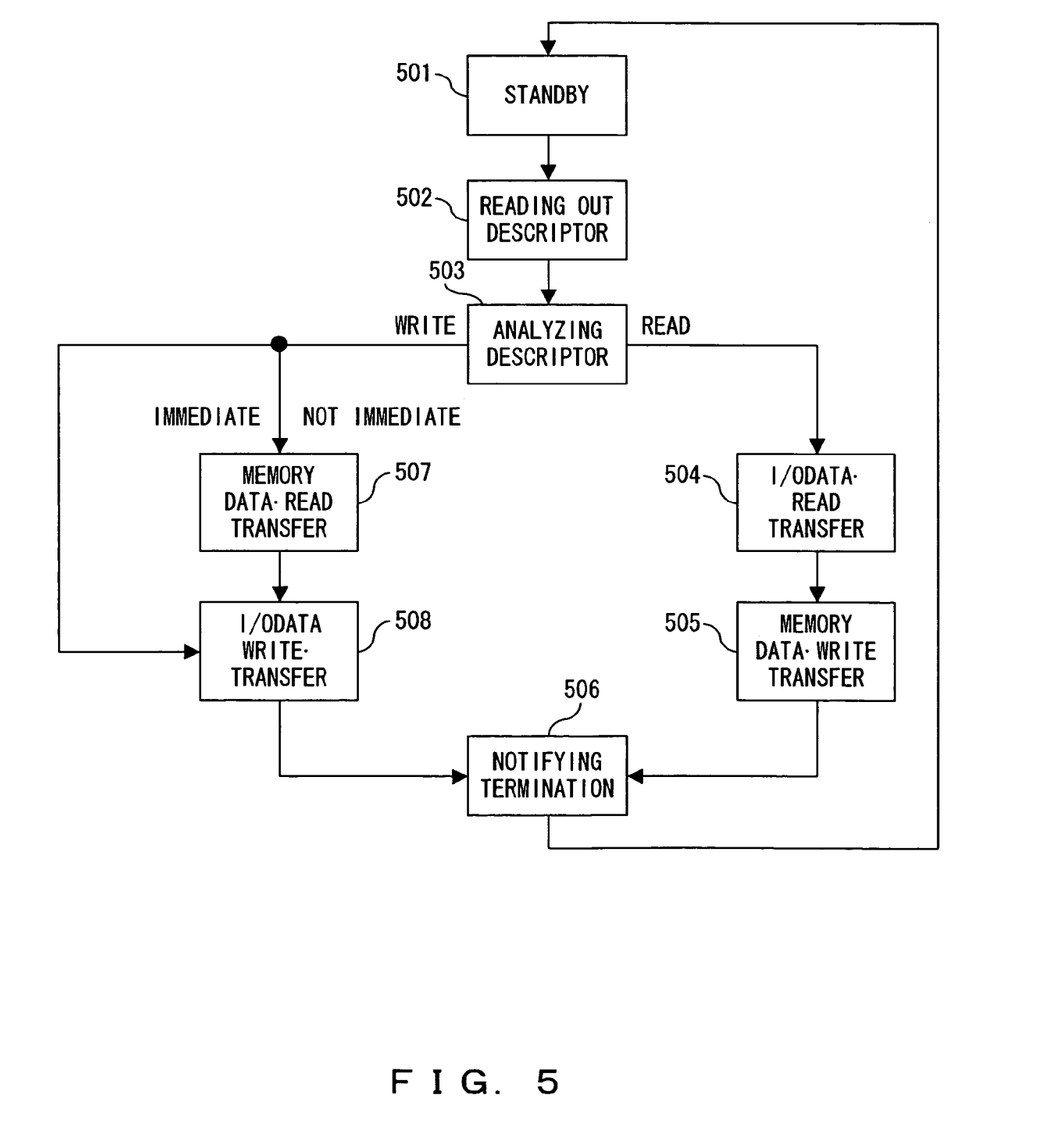
FIG. 5 is the first operation flowchart of a state machine circuit.

FIG. 5 is a flowchart showing one example of the control operation performed by the state machine circuit 213 of FIG. 3. In this control operation, the memory transfer control circuit 221 and the I/O device transfer control circuit 223 in the data transfer control circuit 214 are sequentially activated.

When the state machine circuit 213 is activated by a CPU from an idle condition (step 501), it first reads out a descriptor from the descriptor buffer 212 (Step 502). Then, it analyzes the descriptor and checks whether the command indicates read transfer or write transfer and whether the write•immediate•bit of a flag is '0' or '1' in the case of write transfer (step 503).

If the command indicates read transfer, the state machine circuit 213 activates the I/O device transfer control circuit 223 and instructs I/O data-read transfer (Step 504). Upon receipt of this instruction, the I/O device transfer control circuit 223 reads out data of the designated transfer byte length from an I/O address designated in the descriptor and stores the read-out data in the data buffer 222.

Then, the state machine circuit 213 activates the memory transfer control circuit 221 and instructs memory data•write transfer (step 505). Upon receipt of this instruction, the memory transfer control circuit 221 reads out data from the data buffer 222 and transfers the read-out data to the memory address designated in the descriptor.

After that, the state machine circuit 213 notifies a CPU of a data transfer termination using an interruption signal and returns to an idle condition (step 506).

On the other hand, if the command indicates write transfer and the write•immediate•bit is '0', the state machine circuit 213 activates the memory transfer control circuit 221 and instructs memory data•read transfer (step 507). Upon receipt of this instruction, the memory transfer control circuit 221 reads out data of the designated transfer byte length from the memory address that is designated in the descriptor, thereby storing the read-out data in the buffer 222.

Then, the state machine circuit 213 activates the I/O device transfer control circuit 223 and instructs an I/O data•write transfer (step 508). Upon receipt of this instruction, the I/O device transfer control circuit 223 reads out data that is stored in the data buffer 222 and transfers the read-out data to the I/O address designated in the descriptor. After that, the state machine circuit 213 performs an operation in step 506.

If the command indicates write transfer and a write•immediate•bit is '1', the state machine circuit 213 performs operations in and after step 508. At this time, the circuit 213 instructs the I/O device transfer control circuit 223 to read out data from the descriptor buffer 212 (step 508). Upon receipt of this instruction, the I/O device transfer control circuit 223 reads out data not from the data buffer 222 but from the immediate•write•data field in the descriptor stored in the descriptor buffer 212 and transfers the read-out data to the designated I/O address.

Figure 6:
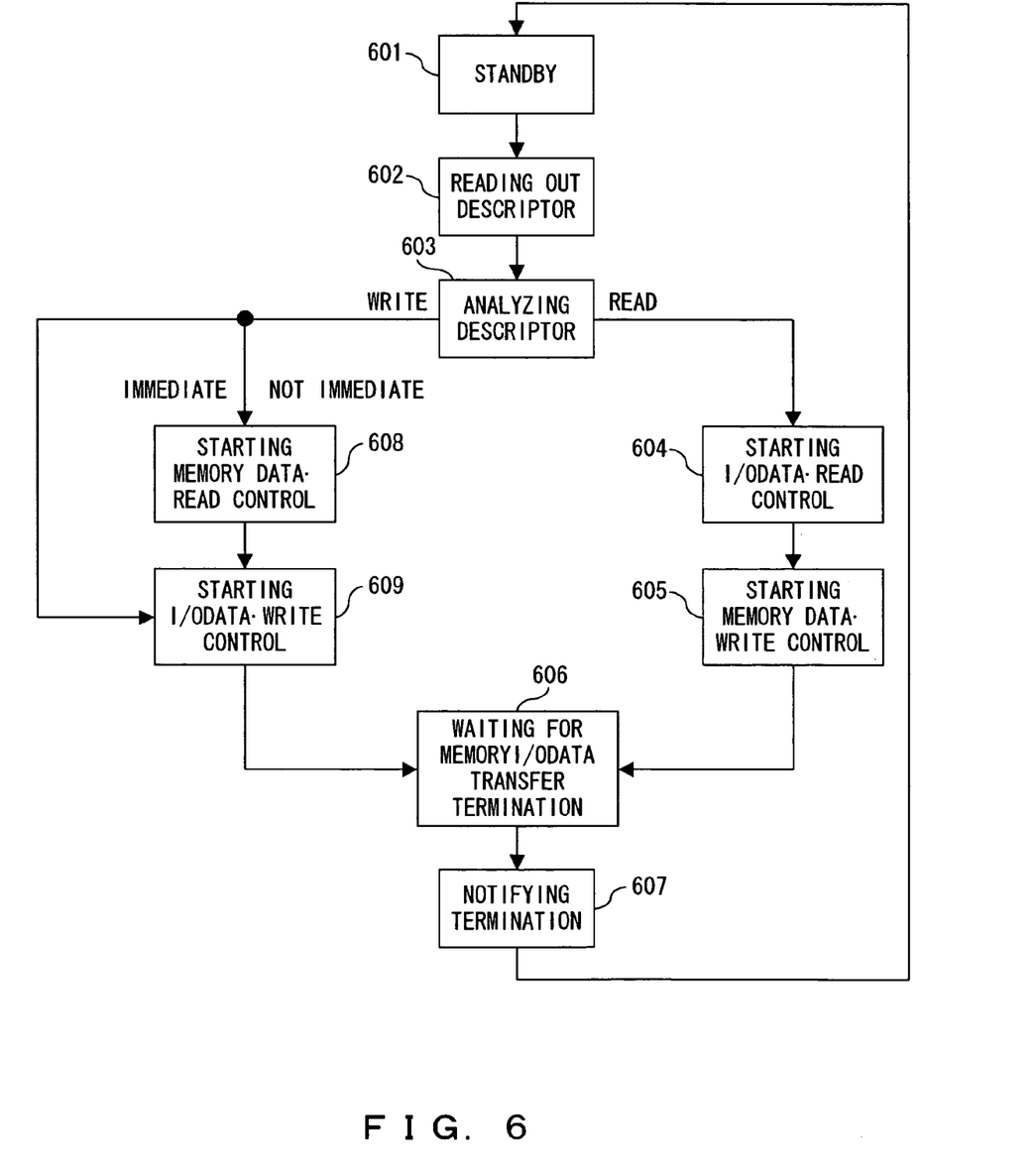
FIG. 6 is the second operation flowchart of a state machine circuit.

FIG. 6 is a flowchart of other control operations performed by the state machine circuit 213. In these control operations, the memory transfer control circuit 221 and the I/O device transfer control circuit 223 in the data transfer control circuit 214 are simultaneously activated.

Since the memory transfer control circuit 221 and the I/O device transfer control circuit 223 operate in parallel while receiving and transmitting mutual pointer information, they pursue data transfer while using the data buffer 222 as a FIFO (First-In First-Out) circuit. As pointer information, a write pointer indicating a write position of the data buffer 222 and a read pointer of the data buffer 222 are used.

Such a control is effective especially in the case where a transfer byte length is longer than a size of the data buffer 222 or in the case where the transfer byte length is much longer than a typical burst transfer length of the memory interface 202 and the I/O device interface 203.

Operations in steps 601, 602, 603 and 607 of FIG. 6 are identical to those in steps 501, 502, 503 and 506 of FIG. 5.

If the command indicates read transfer instep 603, the state machine circuit 213 activates the I/O device transfer control circuit 223 and instructs I/O data read transfer (step 604). At the same time, the circuit 213 activates the memory transfer control circuit 221 and instructs memory data•write transfer (step 605). Then, the circuit 213 waits for both a memory data transfer termination notification from the memory transfer control circuit 221 and an I/O data transfer termination notification from the I/O device transfer control circuit 223 (step 606).

The I/O device transfer control circuit 223 sequentially reads out data of the designated transfer byte length from the designated I/O address in the descriptor and writes the read-out data in the data buffer 222. The memory transfer control circuit 221 sequentially reads out the data written from the data buffer 222 in parallel with a write operation of the I/O device transfer control circuit 223 and then it transfers the read-out data to the memory address designated in the descriptor. In this way, the data is read out in the order of being written in the data buffer 222, the read-out data is transferred to the memory and the next data is sequentially written in after the read-out data.

In this way, when all the data of the designated transfer byte length is transferred to the memory, the memory transfer control circuit 221 and the I/O device transfer control circuit 223 notify the state machine circuit 213 of both a memory data transfer termination and an I/O data transfer termination, respectively. Upon receipt of these notifications, the state machine circuit 213 notifies the CPU of a data transfer termination using an interruption signal (step 607).

On the other hand, if the command indicates write transfer and a write•immediate•bit is '0', the state machine circuit 213 activates the memory transfer control circuit 221 and instructs memory data•read transfer (step 608). At the same time, the circuit 213 activates the I/O device transfer control circuit 223 and instructs I/O data•write transfer (step 609). Then, the circuit 213 performs operations in and after step 606.

Then, the memory transfer control circuit 221 sequentially reads out data of the designated transfer byte length from a memory address designated in the descriptor and writes the read-out data in the data buffer 222. The I/O device transfer control circuit 223 sequentially reads out data written from the data buffer 222 in parallel with a write operation of the memory transfer control circuit 221 and transfers the read-out data to the I/O address designated in the descriptor. In this way, the data is read out in the order of being written in the data buffer 222 and the read-out data is transferred to the I/O device. The next data is sequentially written in after the read-out data.

In this way, when all the data of the designated transfer byte length is transferred to the I/O devices, the memory transfer control circuit 221 and the I/O device transfer control circuit 223 notify the state machine circuit 213 of both a memory data transfer termination and an I/O data transfer termination, respectively. Then, the state machine circuit 213 performs the operation in step 607.

If the command indicates write transfer and the write•immediate•bit is '1', the state machine circuit 213 performs operations in and after step 609. At this time, the circuit 213 instructs the I/O device transfer control circuit 223 to read out data from the descriptor buffer 212 (step 609). Upon receipt of this instruction, the I/O device transfer control circuit 223 reads out data not from the data buffer 222 but from an immediate•write data field in the descriptor stored in the descriptor buffer 212 and transfers the read-out data to a designated I/O address.

In this case, when data transfer of the designated transfer byte length terminates, the I/O device transfer control circuit 223 notifies the state machine circuit 213 of an I/O data transfer termination. The state machine circuit 213 performs the operation in step 607.

Meanwhile, a program to be implemented by the CPU other than the transfer data and the descriptor is stored in the memory of a data processing apparatus. The CPU performs a data processing by implementing the program using the memory.

Figure 7:
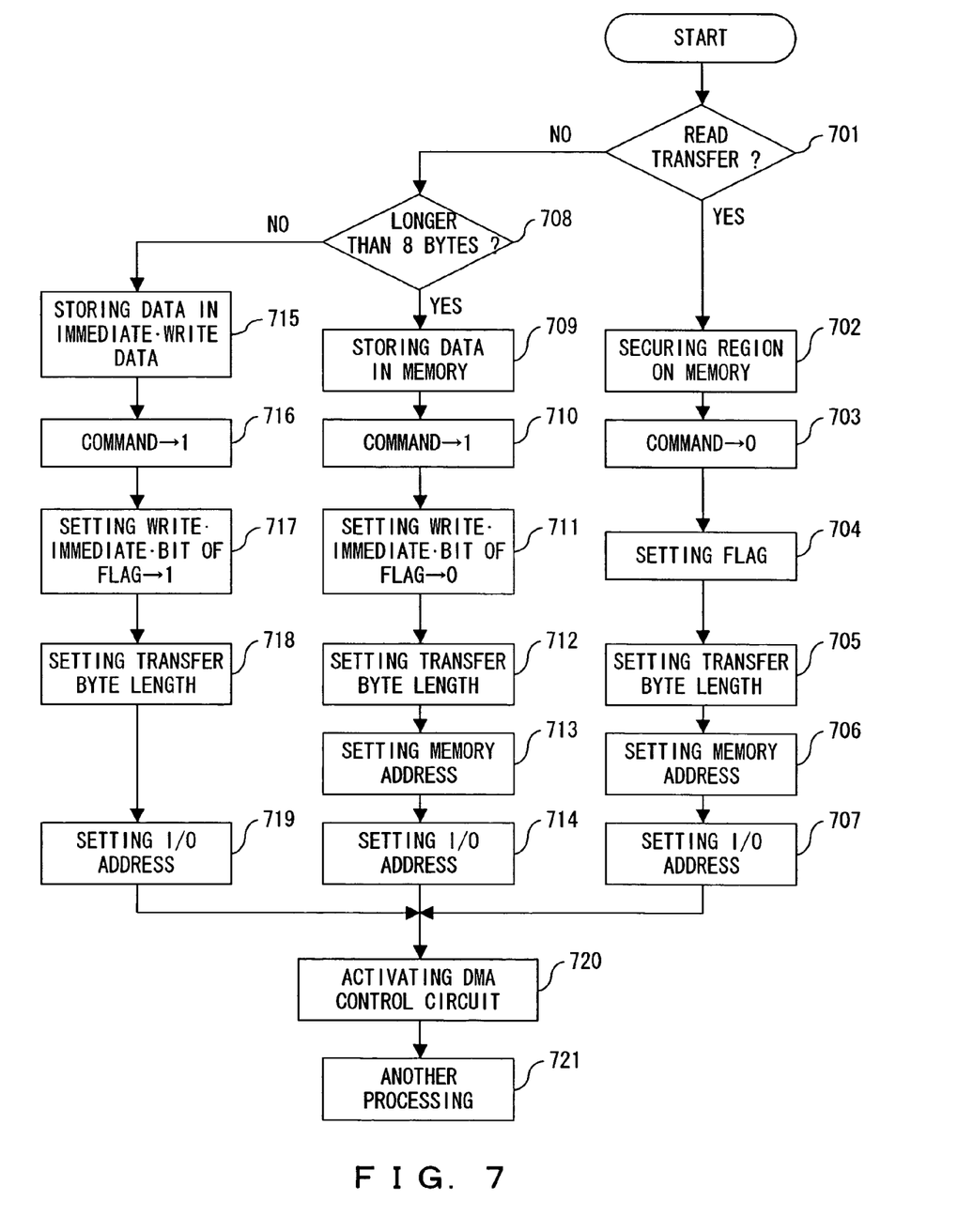
FIG. 7 is the flowchart of the processes to be carried out by a CPU.

FIG. 7 shows a flowchart of the processings performed by the CPU when data transfer occurs. The CPU first checks whether the occurred data transfer is read transfer or write transfer (step 701).

If the occurred data transfer is read transfer, a region for transfer data is secured in the memory (step 702) and the command of a descriptor region of the predetermined address on the memory is set to '0' (Step 703). Then, the CPU sets a flag of the descriptor region (step 704), sets the number of bytes of the transfer data to a transfer byte length (step 705), sets an address of the region secured in the memory address (step 706) and sets the I/O device number of a transfer source and a transfer destination address in the device, to an I/O address (step 707).

On the other hand, if the occurred data transfer is write transfer, the CPU checks whether or not a data length of the transfer data is longer than 8 bytes (step 708).

If the data length is longer than 8 bytes, the CPU stores the transfer data in the memory (step 709) and sets a command of the descriptor region on the memory to '1' (step 710). Then, the CPU sets the write•immediate•bit of a flag of the descriptor region to '0' (step 711), sets the number of bytes of the transfer data in the transfer byte length (step 712), sets an address of the transfer data in the memory address (step 713) and sets both a I/O device number of the transfer destination and a transfer destination address in the I/O device in the I/O address (step 714).

If the data length is equal to or less than 8 bytes, the CPU stores the transfer data in an immediate•write data field of the descriptor region in the memory (step 715) and sets a command of the descriptor region to '1' (step 716). Then, the CPU sets the write•immediate•bit of a flag of the descriptor region to '1' (step 717), sets the number of bytes of the transfer data in the transfer byte length (step 718), and sets both the I/O device number of a transfer destination and a transfer destination address in the I/O device in the I/O address (step 714).

When the setting of the descriptor terminates, the CPU activates the DMA control circuit 201 (step 720) and performs other processes until it receives an interruption signal from the DMA control circuit 201 (step 721).

Figure 8:
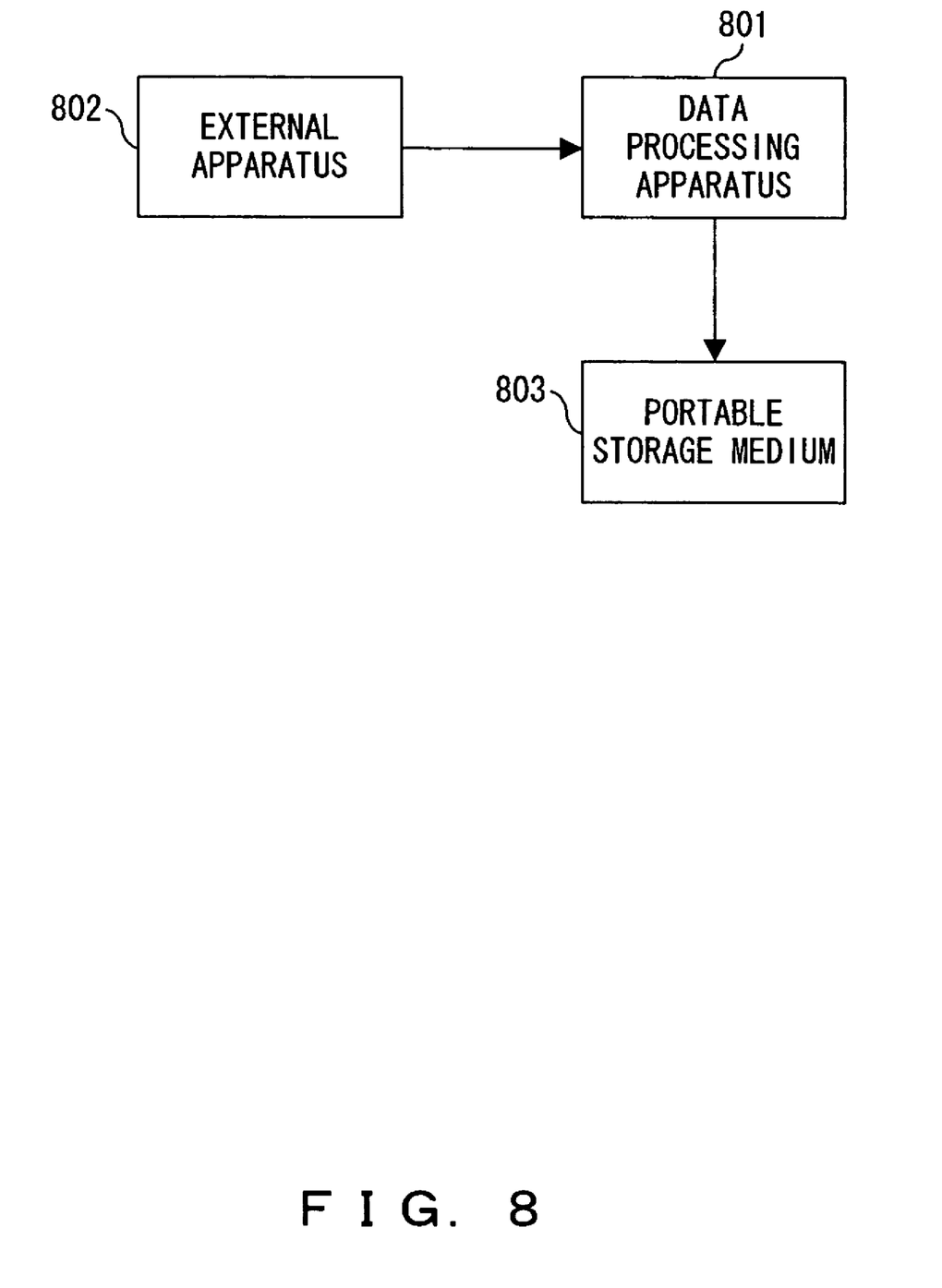
FIG. 8 shows a method of offering a program.

FIG. 8 shows a method of offering a program to be used for processes by the CPU. The program that is stored in an external apparatus 802, a portable storage medium 803 of a data processing apparatus (computer) etc. is loaded into the memory of a data process apparatus 801. The external apparatus 802 generates a conveyance signal for conveying the program and transmits the signal to the data processing apparatus 801 through an optional transmission medium on a communication network. The portable storage medium 803 includes an optional computer-readable storage medium such as a memory card, a flexible disk, an optical disk, a magneto-optical disc, etc. A CPU of the data processing apparatus 801 implements the program and performs a data processing.

Another data control apparatus other than a storage apparatus such as a magnetic disk apparatus, an optical disk apparatus, a magnet-optical disk apparatus, a tape apparatus, etc. and an interface apparatus can be connected to the data transfer control apparatus in a data processing apparatus as an I/O device.

As one example of the data processing apparatus, a storage apparatus is cited. The storage apparatus comprises a memory apparatus that is shared by a plurality of access apparatuses like a host computer and a storage control apparatus that controls data transfer between an access apparatus and a memory apparatus. In this case, the memory apparatus corresponds to an I/O device while the storage control apparatus corresponds to a data transfer control apparatus. By applying the present invention to the storage apparatus, the data transfer from the storage control apparatus to the memory apparatus is improved.

What is claimed is:

1. Direct memory access control apparatus for controlling data transfer from a memory to a transfer destination apparatus in accordance with a command assigned from a processing apparatus, comprising:
   a command storage device for storing a data transfer command assigned from the processing apparatus; and
   a transfer control device for checking whether or not the data transfer command stored in the command storage device includes transfer data to be transferred to the transfer destination apparatus, when the data transfer command does not include the transfer data, for reading out the transfer data from the memory, thereby transferring the read-out data to the transfer destination apparatus and when the data transfer command includes the transfer data, for reading out the transfer data from the command storage device, thereby transferring the read-out data to the transfer destination apparatus.

2. The apparatus of claim 1, wherein the command storage device is arranged to store a data transfer command including the transfer data in a case where a data length of the transfer data is equal to or less than a predetermined value and is arranged to store a data transfer command not-including the transfer data in a case where the data length of the transfer data is longer than a predetermined value.

3. The apparatus of claim 1 or 2, wherein:
   the command storage device is arranged to store a data transfer command having flag information for showing whether or not the transfer data is included; and
   the transfer control device is arranged to analyze the flag information and to check whether or not the data transfer command includes the transfer data.

4. A data transfer control apparatus for controlling data transfer to a transfer destination apparatus, comprising:
   a memory;
   a processing device for issuing a data transfer command for instructing the transfer destination apparatus about data transfer;
   a command storage device for storing the data transfer command; and
   a transfer control device for checking whether or not the data transfer command stored in the command storage device includes transfer data to be transferred to the transfer destination apparatus, when the data transfer command does not include the transfer data, for reading out the transfer data from the memory, thereby transferring the read-out data to the transfer destination apparatus and when the data transfer command includes the transfer data, for reading out the transfer data from the command storage device, thereby transferring the read-out data to the transfer destination apparatus.

5. Data processing apparatus, comprising:
   a memory;
   a processing apparatus for issuing a data transfer command for instructing data transfer to the transfer destination apparatus;
   a command storage device for storing the data transfer command; and
   a transfer control device for checking whether or not a data transfer command stored in the command storage device includes transfer data to be transferred to the transfer destination apparatus, when the data transfer command does not include the transfer data, for reading out the transfer data from the memory, thereby transferring the read-out data to the transfer destination apparatus and when the data transfer command includes the transfer data, for reading out the transfer data from the command storage device, thereby transferring the read-out data to the transfer destination apparatus.

6. A computer-readable storage medium storing a program for a processing apparatus for assigning a command to a direct memory access control apparatus for controlling, when data transfer from a memory to a transfer destination apparatus occurs, the data transfer, wherein the program directs the processing apparatus to perform the following operations:
   checking whether or not a data length of transfer data to be transferred to the transfer destination apparatus is longer than a predetermined value;

if the data length is longer than the predetermined value, storing the transfer data in the memory setting in the data transfer command flag information indicating that a data transfer command does not include the transfer data and a memory address of the transfer data, and if the data length is equal to or less than the predetermined value setting in the data transfer command flag information indicating that the data transfer command includes the transfer data; and activating the direct memory access control apparatus and directing this apparatus to perform data transfer designated by the data transfer command.

7. A conveyance signal for conveying a program for a processing apparatus for assigning a command to a direct memory access control apparatus controlling, when data transfer from a memory to a transfer destination apparatus occurs, the data transfer, wherein the program directs the processing apparatus to perform the following operations:

checking whether or not a data length of transfer data to be transferred to the transfer destination apparatus is longer than a predetermined value;

if the data length is longer than the predetermined value storing the transfer data in the memory, and setting in the data transfer command flag information indicating that a data transfer command does not include the transfer data and a memory address of the transfer data, and if the data length is less than or equal to the predetermined value, setting in the data transfer command the transfer data and flag information indicating that the data transfer command includes the transfer data; and activating the direct memory access control apparatus and directing this apparatus to perform data transfer designated by the data transfer command.

8. A direct memory access control method for controlling data transfer from a memory to a transfer destination apparatus in accordance with a command assigned from a processing apparatus, comprising:

storing a data transfer command assigned from the processing apparatus in a command storage device;

checking whether or not a data transfer command stored in the command storage device includes transfer data to be transferred to the transfer destination apparatus;

when the data transfer command does not include the transfer data reading out the transfer data from the memory, thereby transferring the read-out data to the transfer destination apparatus; and when the data transfer command includes the transfer data, reading out the transfer data from the command storage device, thereby transferring the read-out data to the transfer destination apparatus.

* * * * *